US012562093B2

(12) United States Patent
Zhao et al.

(10) Patent No.: US 12,562,093 B2
(45) Date of Patent: Feb. 24, 2026

(54) CONTROL SYSTEM, AND VEHICLE-MOUNTED DISPLAY DEVICE AND LIGHT ADJUSTMENT METHOD THEREOF

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Chengjie Zhao, Beijing (CN); Wenjie Hu, Beijing (CN); Qiang Li, Beijing (CN); Chengte Lai, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 62 days.

(21) Appl. No.: 18/263,423

(22) PCT Filed: Jun. 30, 2022

(86) PCT No.: PCT/CN2022/103195
§ 371 (c)(1),
(2) Date: Jul. 28, 2023

(87) PCT Pub. No.: WO2024/000549
PCT Pub. Date: Jan. 4, 2024

(65) Prior Publication Data
US 2025/0006100 A1 Jan. 2, 2025

(51) Int. Cl.
*G09G 3/3225* (2016.01)
*G09G 3/20* (2006.01)

(52) U.S. Cl.
CPC ......... *G09G 3/2044* (2013.01); *G09G 3/2077* (2013.01); *G09G 3/2092* (2013.01);
(Continued)

(58) Field of Classification Search
CPC .. G09G 3/2044; G09G 3/2077; G09G 3/2092; G09G 3/3225; G09G 2320/0626;
(Continued)

(56) References Cited

U.S. PATENT DOCUMENTS 10,902,766 B1 1/2021 Wu et al.
11,341,915 B2 * 5/2022 Yin ...................... G09G 3/3258
(Continued)

FOREIGN PATENT DOCUMENTS

CN 106328086 A 1/2017
CN 109559696 A * 4/2019 ........... G09G 3/3607
(Continued)

OTHER PUBLICATIONS

PCT International Search Report (w/ English translation) and Written Opinion for corresponding PCT Application No. PCT/CN2022/103195, mailed Mar. 3, 2023, 9 pages.

*Primary Examiner* — Julie Anne Watko
(74) *Attorney, Agent, or Firm* — Dority & Manning, P.A.

(57) ABSTRACT

A control system includes: a timing control sub-circuit, a gamma register sub-circuit, a source driving sub-circuit, and a power management sub-circuit. The timing control sub-circuit is electrically connected to the gamma register sub-circuit and the source driving sub-circuit, the gamma register sub-circuit is electrically connected to the source driving sub-circuit, the power management sub-circuit is electrically connected to the timing control sub-circuit, the gamma register sub-circuit and the source driving sub-circuit.

20 Claims, 9 Drawing Sheets

(52) U.S. Cl.
CPC ............. *G09G 3/3225* (2013.01); *G09G 3/20* (2013.01); *G09G 2320/0626* (2013.01); *G09G 2320/0646* (2013.01); *G09G 2320/0653* (2013.01); *G09G 2320/066* (2013.01); *G09G 2320/0673* (2013.01); *G09G 2320/103* (2013.01); *G09G 2330/00* (2013.01); *G09G 2330/021* (2013.01); *G09G 2330/028* (2013.01); *G09G 2340/0457* (2013.01); *G09G 2340/14* (2013.01); *G09G 2340/16* (2013.01); *G09G 2360/12* (2013.01)

(58) Field of Classification Search
CPC ... G09G 2320/0646; G09G 2320/0653; G09G 2320/066; G09G 2320/0673; G09G 2320/103; G09G 2330/00; G09G 2330/021; G09G 2330/028; G09G 2340/0457; G09G 2340/14; G09G 2340/16; G09G 2360/12; G09G 3/20; G09G 3/3696; G09G 3/36; G05B 13/02; H05K 7/18
See application file for complete search history.

(56) References Cited

U.S. PATENT DOCUMENTS

| | | | | |
|---|---|---|---|---|
| 2004/0223373 | A1 | 11/2004 | DCamp et al. | |
| 2008/0084432 | A1 | 4/2008 | Jeon | |
| 2015/0179103 | A1 | 6/2015 | Tani et al. | |
| 2015/0262541 | A1 | 9/2015 | Lai | |
| 2016/0117992 | A1 | 4/2016 | Park et al. | |
| 2017/0076648 | A1 | 3/2017 | Lan et al. | |
| 2017/0290118 | A1 | 10/2017 | Takagimoto | |
| 2018/0090083 | A1 | 3/2018 | Kim et al. | |
| 2019/0164470 | A1 | 5/2019 | Cho et al. | |
| 2020/0082796 | A1 | 3/2020 | Chun et al. | |
| 2021/0097920 | A1 | 4/2021 | Yu et al. | |
| 2021/0174762 | A1 * | 6/2021 | Sun ...................... | G09G 3/2007 |
| 2021/0274616 | A1 | 9/2021 | Kanemitsu et al. | |
| 2022/0319394 | A1 | 10/2022 | Xiao | |
| 2022/0375405 | A1 | 11/2022 | Zhang et al. | |

FOREIGN PATENT DOCUMENTS

| | | | |
|---|---|---|---|
| CN | 109859721 | A | 6/2019 |
| JP | 2010066593 | A | 3/2010 |
| WO | WO 2019127370 | A1 | 7/2019 |

* cited by examiner

CONTROL SYSTEM, AND VEHICLE-MOUNTED DISPLAY DEVICE AND LIGHT ADJUSTMENT METHOD THEREOF

CROSS-REFERENCE TO RELATED APPLICATION

This application is a national phase entry under 35 USC 371 of International Patent Application No. PCT/CN2022/103195, filed on Jun. 30, 2022, which is incorporated herein by reference in its entirety.

TECHNICAL FIELD

The present disclosure relates to the field of display technologies, and in particular, to a control system, a vehicle-mounted display device, and a light adjustment method of a vehicle-mounted display device.

BACKGROUND

Organic light-emitting diodes (OLEDs) have a series of advantages such as all-solid-state structure, high brightness, full viewing angle, fast response, wide operating temperature range, and flexible display. OLED display panels are a major development trend in the field of display technologies, and vehicle-mounted displays using OLED display panels open up a new window for the construction of an ecosystem of human-vehicle interaction.

A vehicle-mounted display is a display device placed on a vehicle to display images or play videos. The vehicle-mounted display has high requirements for product life and reliability, and the service life of vehicle-specification products must be at least 10 years.

SUMMARY

In a first aspect, some embodiments of the present disclosure provide a control system, and the control system includes: a timing control sub-circuit, a gamma register sub-circuit, a source driving sub-circuit, and a power management sub-circuit. The timing control sub-circuit is electrically connected to the gamma register sub-circuit and the source driving sub-circuit, the gamma register sub-circuit is electrically connected to the source driving sub-circuit, and the power management sub-circuit is electrically connected to the timing control sub-circuit, the gamma register sub-circuit and the source driving sub-circuit.

The timing control sub-circuit is configured to: read pre-stored fixed point data, generate voltage fixed point signals, and transmit the voltage fixed point signals to the gamma register sub-circuit; and receive N gamma voltages provided by the source driving sub-circuit, and generate M register values, M being greater than N; and the timing control sub-circuit is further configured to transmit the register values to the source driving sub- circuit in response to a first signal received at a client assembly.

The gamma register sub-circuit is configured to: in response to a first voltage signal received at the power management sub-circuit and the voltage fixed point signals received at the timing control sub-circuit, generate analog gamma voltage signals and transmit the analog gamma voltage signals to the source driving sub-circuit.

The source driving sub-circuit is configured to: receive a plurality of the analog gamma voltage signals, and generate a plurality of gamma voltages between two adjacent analog gamma voltage signals; and in response to a register value signal received at the timing control sub-circuit, generate a data signal and transmit the data signal to the display panel.

The power management sub-circuit is configured to: generate the first voltage signal and transmit the first voltage signal to the gamma register sub-circuit, and generate operating voltages and transmit the operating voltages to the timing control sub-circuit and the source driving sub-circuit.

In some embodiments, the timing control sub-circuit includes at least a first memory, a timing control chip and a second memory. The first memory is configured to pre-store the fixed point data. The timing control chip is electrically connected to the first memory, and the timing control chip is configured to: read the fixed point data in the first memory, generate the voltage fixed point signals, and receive the N gamma voltages transmitted by the source driving sub-circuit, generate the M register values and store the M register values; and the timing control chip is further configured to: in response to the first signal received at the client assembly, read the register values and transmit the register values to the source driving sub-circuit. The second memory is electrically connected to the timing control chip, and the second memory is configured to receive the M register values transmitted by the timing control chip and store the M register values.

The gamma chip is configured to, in response to the voltage fixed point signals received at the timing control chip and the first voltage signal received at the power management sub-circuit, generate the analog gamma voltage signals and transmit the analog gamma voltage signals to the source driving sub-circuit.

In some embodiments, the source driving sub-circuit includes at least a source driving chip, and the source driving chip is electrically connected to the timing control chip and the gamma chip. The source driving chip is configured to: receive the analog gamma voltage signals output by the gamma chip, and generate the gamma voltages; and receive a signal output by the timing control chip, and transmit the data signal to the display panel.

In some embodiments, the power management sub-circuit includes at least a power management chip, and the power management chip is electrically connected to the timing control chip, the gamma chip, the source driving chip, a level shift sub-circuit and a display panel. The power management chip is configured to: provide the operating voltages to the timing control chip and the source driving chip, provide the first voltage signal to the gamma chip, provide a high/low level signal to the level shift sub-circuit, and provide a reset signal to the display panel.

In some embodiments, the control system further includes the level shift sub-circuit, and the level shift sub-circuit is electrically connected to the timing control sub-circuit and the power management chip.

In some embodiments, the control system further includes a level shift chip, the level shift chip is electrically connected to the timing control chip and the power management chip, and the level shift chip is configured to, in response to a signal received at the timing control chip, generate a second signal and transmit the second signal to the display panel.

In a second aspect, some embodiments of the disclosure further provide a vehicle-mounted display device, including the display panel and the control system as described in any of the above embodiments. The display panel is electrically connected to the control system.

In a third aspect, some embodiments of the present disclosure further provide a light adjustment method of a vehicle-mounted display device, which is applied to the vehicle-mounted display device as described in any of the above embodiments. The control system of the vehicle-mounted display device transmits the data signal to the display panel.

The light adjustment method of the vehicle-mounted display device includes: generating the plurality of gamma voltages arranged in descending order or ascending order; generating a plurality of register values by using a dithering algorithm based on the plurality of gamma voltages; and modulating a gamma curve, and generating a corresponding band of the gamma curve according to the plurality of register values and a brightness level of the display panel.

In some embodiments, the power management sub-circuit of the control system is configured to provide the first voltage signal to the gamma register sub-circuit of the control system, and the timing control sub-circuit of the control system is configured to provide a plurality of voltage fixed point signals to the gamma register sub-circuit.

The step of generating the plurality of gamma voltages arranged in descending order or ascending order includes: generating a plurality of analog gamma voltages according to the first voltage signal and the plurality of voltage fixed point signals, each voltage fixed point signal corresponding to an analog gamma voltage; and two adjacent analog gamma voltages being respectively applied to two ends of a plurality of resistors in series, a voltage between two ends of each resistor being a gamma voltage, and the plurality of gamma voltages arranged in descending order or ascending order being generated from the two adjacent analog gamma voltages.

In some embodiments, a number of the gamma voltages is 256.

In some embodiments, the step of generating the plurality of register values by using the dithering algorithm based on the plurality of gamma voltages includes: a plurality of adjacent pixels of the display panel constituting a pixel group, a gray scale of each pixel in the pixel group corresponding to a gamma voltage of the plurality of gamma voltages, and a value of a gray scale of the pixel group being an average value of values of gray scales of the plurality of adjacent pixels; and gamma voltages of the plurality of pixels corresponding to the gray scale of the pixel group being a register value corresponding to the gray scale of the pixel group.

In some embodiments, a number of the adjacent pixels in the pixel group is at least two, and a value of the gray scale of each pixel is the same and/or continuous. A number of the register values is at least 512.

In some embodiments, the step of generating the plurality of register values by using the dithering algorithm based on the plurality of gamma voltages includes: an average value of values of gray scales of pixels of the display panel in each frame of a plurality of consecutive frames being a display gray scale of any pixel; and gamma voltages corresponding to gray scales of the any pixel in the plurality of consecutive frames being a register value corresponding to the display gray scale.

In some embodiments, values of gray scales of the any pixel in at least two adjacent frames are the same and/or continuous; and a number of the register values is at least 512.

In some embodiments, the control system transmits the data signal to the display panel.

The light adjustment method of the vehicle-mounted display device further includes: the vehicle-mounted display device modulating the data signal from a continuous signal to a pulse signal; obtaining a maximum register value corresponding to pixels of the display panel according to a duty ratio of the pulse signal and a brightness level of the display panel; and selecting a corresponding gamma curve according to the maximum register value corresponding to the pixels.

In some embodiments, selecting the corresponding gamma curve according to the maximum register value corresponding to the pixels includes: a maximum value of register values corresponding to the gamma curve being the same as the maximum register value corresponding to the pixels of the display panel.

In some embodiments, brightness levels of the plurality of consecutive frames of the display panel decrease or increase, and the gamma curve is constant; a ratio of a brightness level of a current frame of the plurality of consecutive frames to a brightness level of a next frame of the plurality of consecutive frames is the same as a ratio of a duty ratio of a pulse signal for generating the current frame to a duty ratio of a pulse signal for generating the next frame.

In some embodiments, the number of pulses of the data signal for generating one frame is four.

In some embodiments, a duty ratio of the pulse signal is greater than or equal to 9%.

In a fourth aspect, a computer-readable storage medium is provided. The computer-readable storage medium stores computer instructions executable by a processor that, when executed by the processor, implement one or more steps of the light adjustment method of the vehicle-mounted display device as described in any of the above embodiments.

In a fifth aspect, a computer program product is provided. When run on a computer, the computer program product causes the computer to perform one or more steps of the light adjustment method of the vehicle-mounted display device as described in any of the above embodiments.

BRIEF DESCRIPTION OF THE DRAWINGS

In order to describe technical solutions in the present disclosure more clearly, the accompanying drawings to be used in some embodiments of the present disclosure will be introduced briefly. However, the accompanying drawings to be described below are merely some embodiments of the present disclosure, and a person of ordinary skill in the art can obtain other drawings according to those drawings. In addition, the accompanying drawings in the following description may be regarded as schematic diagrams, but are not limitations on actual sizes of products, actual processes of methods and actual timings of signals involved in the embodiments of the present disclosure.

DETAILED DESCRIPTION

Figure 1:
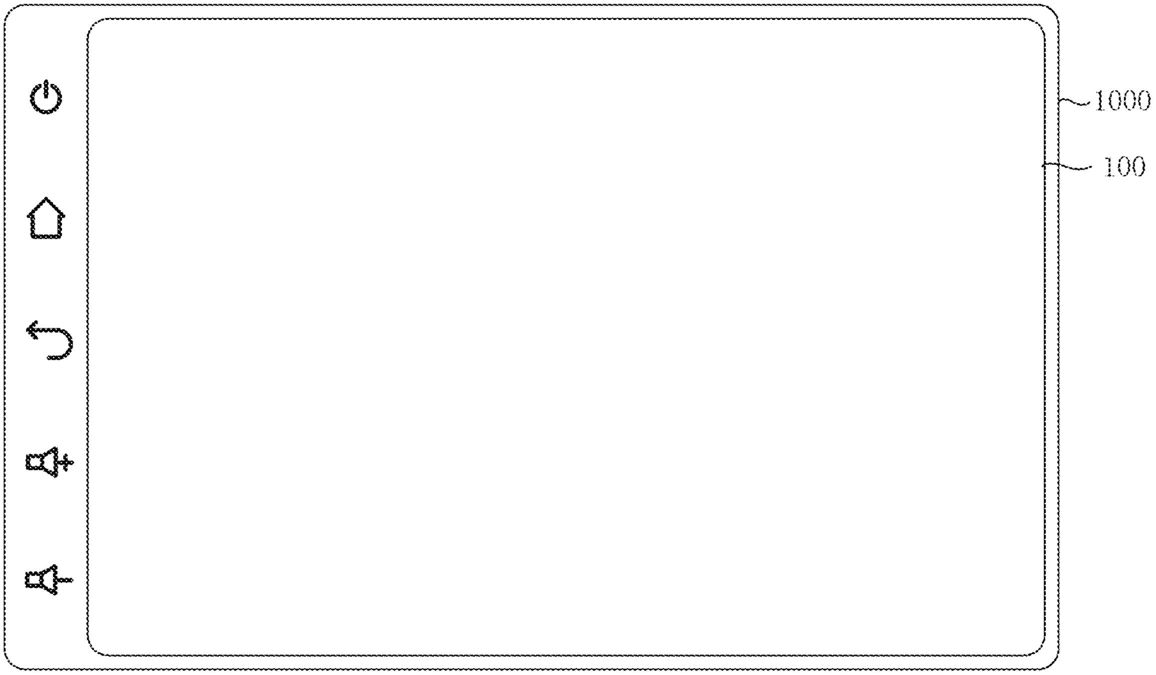
FIG. 1 is a structural diagram of a display device provided in some embodiments of the present disclosure.

The technical solutions in some embodiments of the present disclosure will be described clearly and completely with reference to the accompanying drawings. However, the described embodiments are merely some but not all of embodiments of the present disclosure. All other embodiments obtained by a person having ordinary skill in the art based on the embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed in an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics described herein may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, a feature defined with the term such as "first" or "second" may explicitly or implicitly include one or more features. In the description of the embodiments of the present disclosure, the terms "a plurality of", "the plurality of" and "multiple" each mean two or more unless otherwise specified.

In the description of some embodiments, the terms "coupled", "connected" and derivatives thereof may be used. For example, the term "connected" may be used in the description of some embodiments to indicate that two or more components are in direct physical or electrical contact with each other. As another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B and C" has the same meaning as the phrase "at least one of A, B or C", both including following combinations of A, B and C: only A, only B, only C, a combination of A and B, a combination of A and C, a combination of B and C, and a combination of A, B and C.

The phrase "A and/or B" includes following three combinations: only A, only B, and a combination of A and B.

As used herein, the term "if" is, optionally, construed to mean "when" or "in a case where" or "in response to determining" or "in response to detecting", depending on the context. Similarly, the phrase "if it is determined" or "if [a stated condition or event] is detected" is, optionally, construed to mean "in a case where it is determined" or "in response to determining" or "in a case where [the stated condition or event] is detected" or "in response to detecting [the stated condition or event]", depending on the context.

The use of "applicable to" or "configured to" herein means an open and inclusive expression, which does not exclude devices that are applicable to or configured to perform additional tasks or steps.

In addition, the phrase "based on" used is meant to be open and inclusive, since processes, steps, calculations or other actions "based on" one or more of the stated conditions or values may, in practice, be based on additional conditions or values exceeding those stated.

The term such as "about" or "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

Exemplary embodiments are described herein with reference to segmental views and/or plan views as idealized exemplary drawings. In the accompanying drawings, thicknesses of layers and sizes of regions are enlarged for clarity. Variations in shapes with respect to the accompanying drawings due to, for example, manufacturing technologies and/or tolerances may be envisaged. Therefore, the exemplary embodiments should not be construed as being limited to the shapes of the regions shown herein, but including deviations in the shapes due to, for example, manufacturing. For example, an etched region shown in a rectangular shape generally has a feature being curved. Therefore, the regions shown in the accompanying drawings are schematic in nature, and their shapes are not intended to show actual shapes of regions in a device, and are not intended to limit the scope of the exemplary embodiments.

Some embodiments of the present disclosure provide a display device, and the display device may be, for example, a mobile phone, a tablet computer, a personal digital assistant (PDA), a television, a vehicle-mounted computer, a wearable display device, and the like. As shown in FIG. 1, the display device 1000 may be, for example, a vehicle-mounted display, and the display device 1000 includes a display panel 100. The embodiments of the present disclosure are described by taking a vehicle-mounted display as an example.

In some embodiments, the display device 1000 includes a display panel 100 and a control system. The display panel 100 may be an OLED display panel, and the OLED display panel is taken as an example for introduction below. The control system is used to drive the display panel 100 to operate. The control system may include a source driving sub-circuit, a timing controller, and a level shifter. A control system of a consumer specification product often uses a highly integrated chip to reduce a size of the product and costs. For example, a source driving sub-circuit, a timing controller, and a level shifter of a display device such as a mobile phone or a television often use highly integrated chips. The high integration and high complexity of the chip may cause the risk of the reduced reliability, and the service life is greatly reduced. Overall, the reliability of the control system is reduced. Correspondingly, the reliability of the display device 1000 is reduced, and the product life is greatly reduced.

The vehicle-mounted display has high requirements on product life and reliability, and the service life must be at least 10 years. For example, the consumer specification product cannot meet the performance requirements of the vehicle-mounted display.

Figure 2:
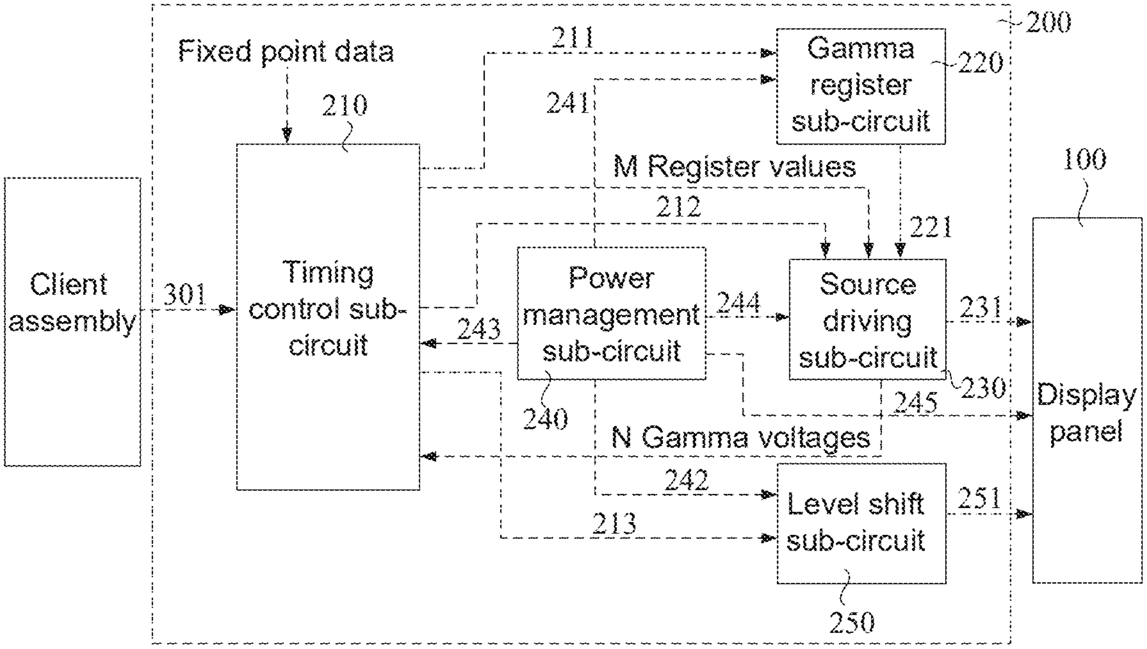
FIG. 2 is a circuit diagram of a control system provided in some embodiments of the present disclosure.

In light of this, some embodiments of the present disclosure provide a control system 200. As shown in FIG. 2, the control system 200 includes: a timing control sub-circuit 210, a gamma register sub-circuit 220, a source driving sub-circuit 230, and a power management sub-circuit 240, and a level shift sub-circuit 250. The timing control sub-circuit 210 is electrically connected to the gamma register sub-circuit 220 and the source driving sub-circuit 230. The gamma register sub-circuit 220 is electrically connected to the source driving sub-circuit 230. The power management sub-circuit 240 is electrically connected to the timing control sub-circuit 210, the gamma register sub-circuit 220 and the source driving sub-circuit 230. The level shift sub-circuit 250 is electrically connected to the timing control sub-circuit 210 and the power management sub-circuit 240.

The timing control sub-circuit 210 is configured to read prestored fixed point data and generate voltage fixed point signals 211, transmit the voltage fixed point signals 211 to the gamma register sub-circuit 220, receive N gamma voltages provided by the source driving sub-circuit 230, and generate M register values, M being greater than N. The timing control sub-circuit 210 is further configured to transmit the register values to the source driving sub- circuit 230 in response to a first signal 301 received at a client assembly.

The gamma register sub-circuit 220 is configured to, in response to a first operating voltage (i.e., a first voltage signal) 241 received at the power management sub-circuit 240 and the voltage fixed point signals 211 received at the timing control sub-circuit 210, generate analog gamma voltage signals 221 and transmit the analog gamma voltage signals 221 to the source driving sub-circuit.

The source driving sub-circuit 230 is configured to: receive a plurality of analog gamma voltage signals 221, and generate a plurality of gamma voltages between adjacent two analog gamma voltage signals 221; and in response to a register value signal 212 received at the timing control sub-circuit 210, generate a data signal 231 and transmit the data signal 231 to the display panel 100.

The power management sub-circuit 240 is configured to generate the first operating voltage 241 and transmit the first operating voltage 241 to the gamma register sub-circuit 220, and generate operating voltages and transmit the operating voltages to the timing control sub-circuit 210 and the source driving sub-circuit 230.

The level shift sub-circuit 250 is configured to: in response to a timing control signal 213 received at the timing control sub-circuit 210, generate a second signal 251 according to a high/low level signal 242 received at the power management sub-circuit 240 and transmit the second signal 251 to the display panel 100.

In some examples, the timing control sub-circuit 210 uses a serial communication bus to communicate with the gamma register sub-circuit 220. For example, the timing control sub-circuit 210 and the gamma register sub-circuit 220 may use an inter-integrated circuit (IIC) bus for communication. The timing control sub-circuit 210 and the source driving sub-circuit 230 are electrically connected by mini low voltage differential signaling (Mini-LVDS) interfaces, so as to realize the purpose of the timing control sub-circuit 210 transmitting electrical signal(s) to the source driving sub-circuit 230.

The power management sub-circuit 240 generates voltages and provides the voltages for corresponding modules. For example, the power management sub-circuit 240 provides a second operating voltage 243 for the timing control sub-circuit 210. For example, voltages of the second operating voltage 243 may be 1.8 V and 1.1 V. The power management sub-circuit 240 provides the first operating voltage 241 for the gamma register sub-circuit 220. The power management sub-circuit 240 provides a third operating voltage 244 to the source driving sub-circuit 230. The power management sub-circuit 240 provides the high/low level signal 242 to the level shift sub-circuit. The power management sub-circuit 240 may also provide a reset signal 245 to the display panel 100. The power management sub-circuit 240 may supply power to other modules through connection wires that are fixed on a substrate or a printed circuit board or through a flexible circuit board.

In some examples, the gamma register sub-circuit 220 generates the analog gamma voltage signals 221 and transmits the analog gamma voltage signals 221 to the source driving sub-circuit 230, and the gamma register sub-circuit 220 may transmit the analog gamma voltage signals to the source driving sub-circuit 230 through the connection wires fixed on the substrate or the printed circuit board or through the flexible circuit board. Similarly, the gamma register sub-circuit 220 may transmit the timing control signal 213 to the level shift sub-circuit 250 through the connection wire fixed on the substrate or the printed circuit board or through the flexible circuit board.

In some embodiments of the present disclosure, the timing control sub-circuit 210 is used as a central control unit, is responsible for data calculation and processing, and receives a first signal 301 sent by the client assembly. The first signal 301 includes an LVDS signal and a Reset signal. The source driving sub-circuit 230 receives the register value signal 212 transmitted by the timing control sub-circuit 210, performs a digital-to-analog conversion on the register value signal 212, and then transmit the register value signal 212 undergone the digital-to-analog conversion to the display panel 100. The source driving sub-circuit 230 communicates with the timing control sub-circuit 210 through Mini-LVDS interfaces. Each module is responsible for a single function and has a low integration level, so that the reliability of each module is high. The modules with low integration and single function are connected in cascade to form a complete system, which has more stable performance compared with a single module with high integration and multi- function. That is to say, compared with a control system composed of a single module with highly integration and multi-function, the control system composed of modules with low integration and single function has high stability and good reliability, which greatly improves the stability of the vehicle display device.

Figure 3:
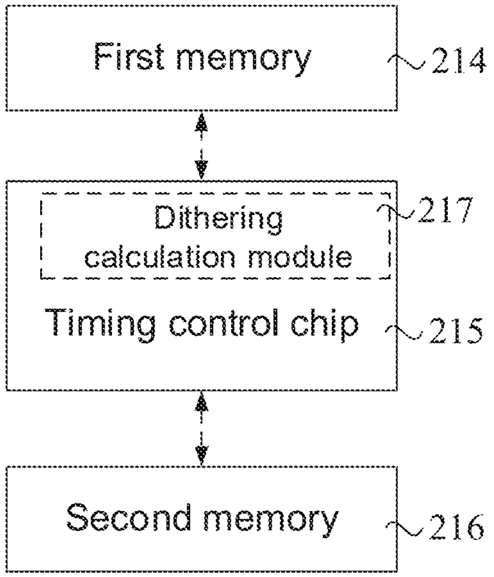
FIG. 3 is a circuit diagram of a timing control sub-circuit provided in some embodiments of the present disclosure.
Figure 4:
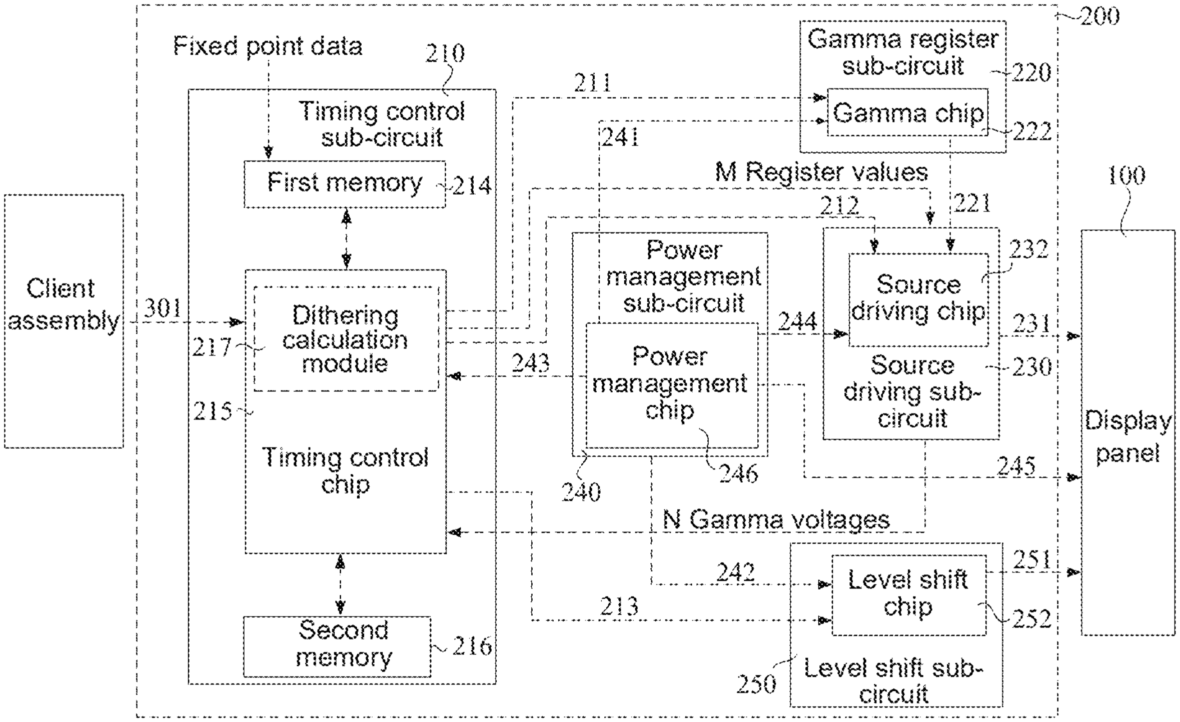
FIG. 4 is a circuit diagram of another control system provided in some embodiments of the present disclosure.

In some embodiments, as shown in FIGS. 3 and 4, the timing control sub-circuit 210 includes at least a first memory 214, a timing control chip 215 and a second memory 216. The first memory 214 is configured to prestore the fixed point data. The timing control chip 215 is electrically connected to the first memory 214. The timing control chip 215 has at least a dithering calculation module 217 capable of performing dithering algorithm. The timing control chip 215 is configured to: read the fixed point data in the first memory 214, generate the voltage fixed point signals, receive the N gamma voltages transmitted by the source driving sub-circuit, generate the M register values, and store the M register values. The timing control chip 215 is further configured to: read the register values in response to the first signal 301 received at the client assembly, and transmit the register values to the source driving sub-circuit. The second memory 216 is electrically connected to the timing control chip 215, and the second memory 216 is configured to receive the M register values transmitted by the timing control chip 215 and store the M register values.

In some examples, the first memory 214 may be an electrically erasable programmable read-only memory (EE-PROM), and the first memory 214 may be used for the pre-stored fixed point data. The control system may read the prestored fixed point data and generate the register values through data calculation. The second memory 216 may be a coded flash memory (FLASH chip), and the second memory 216 may be used to store the register values. The control system may read the stored register values, and control the brightness of the display panel according to data of the client assembly.

The data stored in the first storage 214 is not easy to be lost, and the reading and writing speed of the first memory 214 is relatively slow, and the storage of the first memory 214 is small. The reading speed of the second memory 216 is fast, and the storage of the second memory 216 is large. The fixed point data, used as prestored data, is rarely read during the normal operation of the vehicle-mounted display device, the content of the fixed point data is less content, and the required storage space is small, so that the first memory 214 is suitable for the fixed point data. The content of the register values is great, the required storage space is large, and the register values are often read during the operation of the vehicle-mounted display device, so that the second memory 216 is suitable for storing the register values. The first memory 214 and the second memory 216 will not interfere with each other, which further improve the reliability of the control system, and both are suitable for corresponding stored data.

In some embodiments, as shown in FIG. 4, the gamma register sub-circuit 220 includes at least a gamma chip 222, and the gamma chip 222 is electrically connected to the timing control chip 215, the source driving sub-circuit 230 and the power management sub-circuit 240. The gamma chip 222 is configured to generate the analog gamma voltage signals 221 in response to the voltage fixed point signals 211 received at the timing control chip 215 and the first voltage signal 241 received at the power management sub-circuit 240, and transmit the analog gamma voltage signals 221 to the source driving sub-circuit 230.

For example, the gamma register sub-circuit 220 includes the gamma chip 222 and a voltage reduction device. The voltage reduction device is electrically connected to the gamma chip 222. The gamma chip 222 reads the voltage fixed point signals, and passes the received first voltage signal 241 through the voltage reduction device to generate a set of voltages arranged in ascending order. The set of voltages arranged in ascending order may be, for example, an analog gamma voltage signal GM1, an analog gamma voltage signal GM2, an analog gamma voltage signal GM3, an analog gamma voltage signal GM4, an analog gamma voltage signal GM5, an analog gamma voltage signal GM6, an analog gamma voltage signal GM7, an analog gamma voltage signal GM8, and an analog gamma voltage signal GM9. The analog gamma voltage signals 221 (GM1 to GM9) are further transmitted to the source driving sub-circuit by the gamma chip 222 for calculation.

Figure 19:
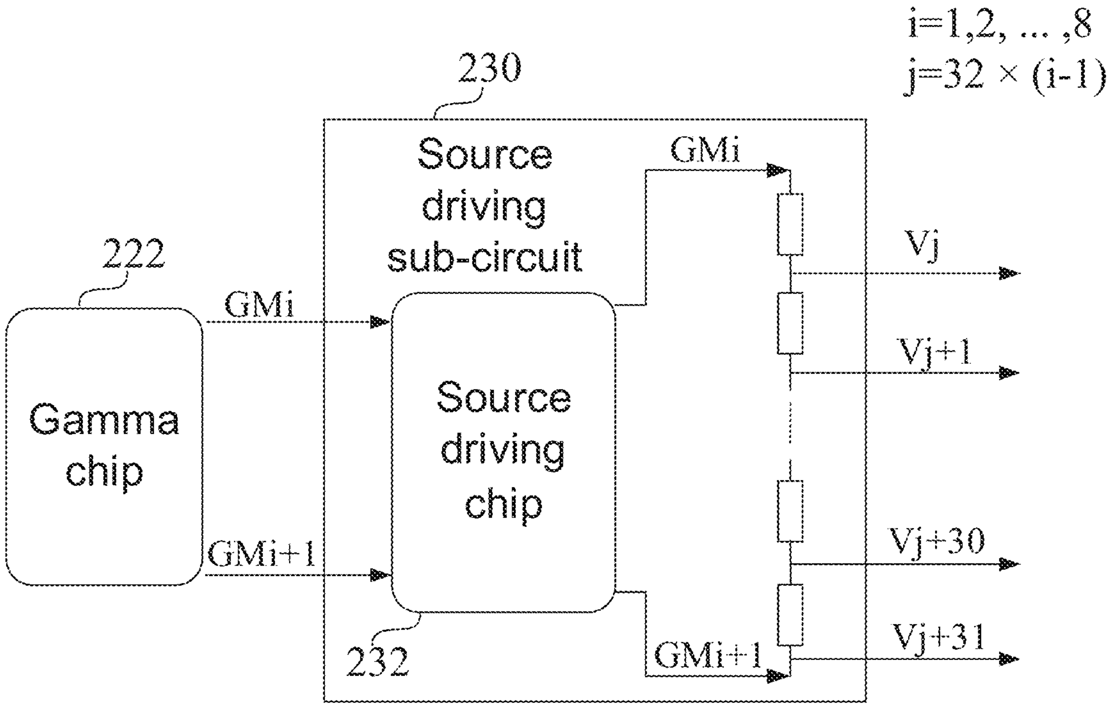
FIG. 19 is a flow diagram showing an operation for generating gamma voltages of a source driving chip provided in some embodiments of the present disclosure.

In some embodiments, as shown in FIGS. 4 and 19, the source driving sub- circuit 230 includes at least a source driving chip 232 and a plurality of resistors in series. The plurality of resistors in series are a resistor string, two ends of the resistor string may be electrically connected to the source driving chip 232, and two ends of each resistor of the resistor string may be one gamma voltage output terminal. The source driving chip 232 is electrically connected to the timing control chip 215 and the gamma chip 222. The source driving chip 232 is configured to: receive the analog gamma voltage signals 221 output by the gamma chip 222 and generate the gamma voltages; and receive a signal output by the timing control chip 215 and transmit the data signal to the display panel 100.

In some examples, the source driving chip 232 receives the analog gamma voltage signals 221 transmitted by the gamma chip 222. For example, the source driving chip 232 receives the analog gamma voltage signal GM1 and the analog gamma voltage signal GM2, the analog gamma voltage signal GM1 and the analog gamma voltage signal GM2 are transmitted to two ends of the resistor string in one-to-one correspondence, and a voltage between two ends of each resistor of the resistor string is a gamma voltage.

In some embodiments, as shown in FIG. 4, the power management sub-circuit 240 includes at least a power management chip 246, and the power management chip 246 is electrically connected to the timing control chip 215, the gamma chip 222, the source driving chip 232, the level shift sub-circuit 250, and the display panel 100.

The power management chip 246 is configured to provide the operating voltage (i.e., the second operating voltage 243) to the timing control chip 215, provide the first voltage signal 241 to the gamma chip 222, provide the third operating voltage 244 to the source driving chip 232, provide the high/low level signal 242 to the level shift sub-circuit 250, and provide the reset signal 245 to the display panel 100.

In some examples, the power management chip 246 is used to generate voltages required by the control system, and provide the voltages for corresponding chips or modules to enable the control system to operate normally. For example, the power management chip 246 may provide the timing control chip 215 with the operating voltage of 1.8 V and 1.1 V. The power management chip 246 may provide the first voltage signal 241 to the gamma chip 222 and provide the third operating voltage 244 to the source driving chip 232; the gamma chip 222 controls the first voltage signal 241 to generate the analog gamma voltage signals 221 (GM1 to GM9); and the source driving chip 232 uses the third operating voltage 244 as the operating voltage.

In some embodiments, as shown in FIG. 4, the control system further includes a level shift chip 252, the level shift chip 252 is electrically connected to the timing control chip 215 and the power management sub-circuit 240, and the level shift chip 252 is configured to generate the second signal 251 in response to a signal received at the timing control chip 215 and transmit the second signal 251 to the display panel.

In some examples, the level shift chip 252 receives the signal transmitted by the timing control chip 215, generates the second signal 251, and transmits the second signal 251 to a gate driving circuit (i.e., Gate on Array (GOA)) in the display panel 100. The second signal 251 may be a clock signal, a start signal, etc.

The second signal 251 may control the operation of the GOA circuit in the display panel 100. The source driving chip 232 transmits the data signal 231 to the display panel 100, and the second signal 251 cooperates with the data signal 231 to control the operation of the display panel 100.

Figure 5:
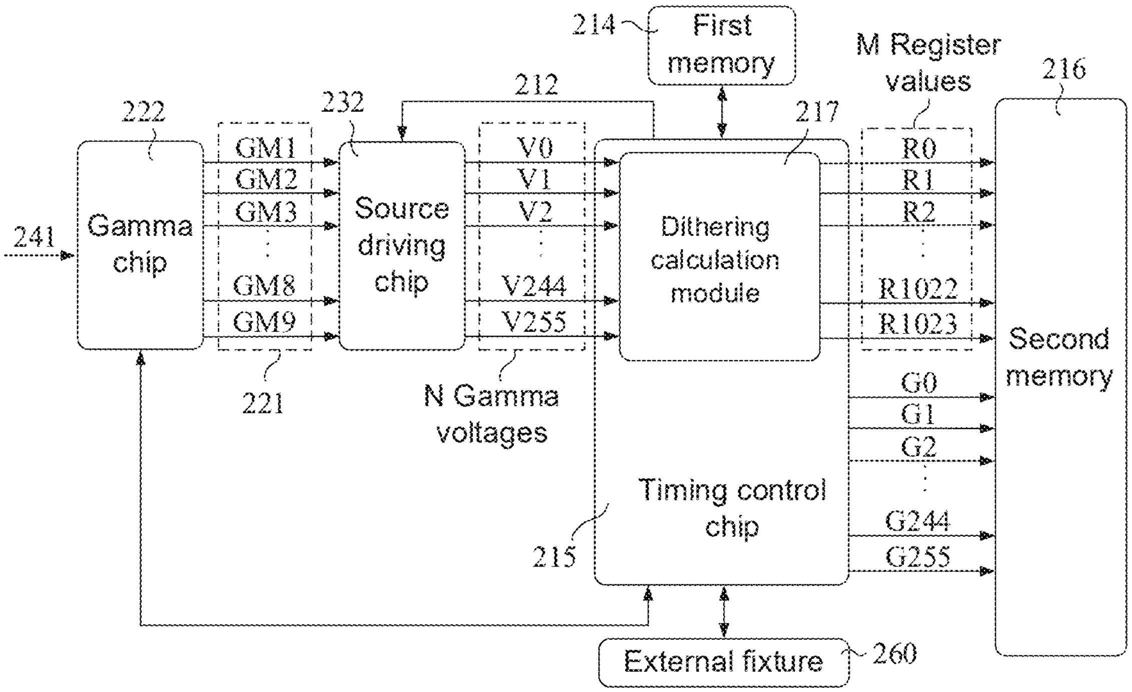
FIG. 5 is a flow diagram showing an operation of a control system provided in some embodiments of the present disclosure.

In the embodiments of the present disclosure, all modules of the control system cooperate with each other to operate, and FIG. 5 shows the operation process of the control system.

The gamma chip 222 receives the first operating voltage 241, and the timing control chip 215 reads the fixed point data prestored in the first memory 214, generates the voltage fixed point signals, and then transmits the voltage fixed point signals to the gamma chip 222. The gamma chip 222 generates nine analog gamma voltage signals 221 (GM1 to GM9). After the nine analog gamma voltage signals 221 (GM1 to GM9) pass through the source driving chip 232, two adjacent analog gamma voltage signals 221 are divided by the plurality of resistors in series to generate 256 gamma voltages. The timing control chip 215 receives the 256 gamma voltages. A part of the timing control chip 215 is used as the dithering calculation module 217, which converts the 256 gamma voltages into 1024 register values by the dithering calculation. The timing control chip 215 and an external fixture 260 perform gamma debugging, so that the display panel may generate corresponding gamma curves (GO to G255) at different brightness levels according to the register values, and store the gamma curves (G0 to G255) in the second memory 216. The external fixture 260 is a debugging device provided in a production line for debugging the display or the display panel to ensure that the user display effect reaches the standard after leaving the factory.

In another aspect, some embodiments of the present disclosure further provide a vehicle-mounted display device, which includes the control system according to any one of the above-mentioned embodiments and a display panel. The display panel is electrically connected to the control system.

In some embodiments, the control system is used to drive the display panel to operate. On the premise of high reliability of the control system, the display device has high reliability and long service life, which meets the high requirements of the vehicle display on the product life and reliability.

Of course, the vehicle-mounted display device provided in the embodiments of the present disclosure may also be applied to other situations besides vehicles, for example, trains, ferries and other places that have high requirements on the lifetime and reliability of the display. Alternatively, the control system applied to the vehicle-mounted display device provided in the embodiments of the present disclosure may also be applied to other displays that have high requirements on lifetime and reliability.

In some embodiments, the number of gray scales output by the low-integration source driving chip is small, which is only 8 bits. For example, the source driving chip may only generate 256 voltage values; the 256 voltage values are arranged in ascending order, which may be a voltage value V1, a voltage value V2, . . . , and a voltage value V256; and each voltage value corresponds to one gray scale.

Generally, the display panel of the OLED display device has a brightness adjustment range, and the display brightness of the display device can be changed within the brightness adjustment range. Under different display brightness levels, in order to ensure that colors of the display image of the display panel can be clearly distinguished, under different display brightness levels, the gray scales are matched with corresponding voltage values. When the display brightness level is high, a voltage value corresponding to a gray scale of a pixel with the maximum brightness level in the display panel is a higher one of the 256 voltage values. Under the display brightness level, voltage values selectable for other pixels in the display panel should be lower than the voltage value corresponding to the gray scale of the pixel with the maximum brightness level. That is to say, when the display brightness level is high, a range of voltage values selectable for gray scales is large; and when the display brightness level is low, the range of voltage values selectable for gray scales is small. Especially, when the display brightness level is low, since the number of voltage values selectable for gray scales is small, the displayed colors of the display panel cannot be well distinguished. For example, when the display brightness level is low, a voltage value corresponding to a gray scale of a brightest pixel in the display panel is low, and the voltage value corresponding to the gray scale of the brightest pixel in the display panel may be a voltage value V100, a voltage value V80 or a voltage value V50. That is to say, when the display brightness level is low, the voltage value corresponding to the gray scale of each pixel in the display panel may be selected from a range from a voltage value V1 to the voltage value V100, in a range from the voltage value V1 to the voltage value V80, or in a range from the voltage value V1 to the voltage value V50.

Considering an example in which the voltage value corresponding to the gray scale of each pixel in the display panel may be selected from the range from the voltage value V1 to the voltage value V100, under this display brightness level, the gray scale may be adjusted in the range from the voltage value V1 to the voltage value V100; since each voltage value corresponds to one gray scale, a value of a gray scale corresponding to the voltage value V1 is the lowest (minimum brightness level), and a value of a gray scale corresponding to the voltage value V100 is the largest (maximum brightness level). That is to say, under the display brightness level of the display panel, the brightness level of the pixel may be adjusted within a range of 100 gray scales.

It can be understood that each pixel of the display panel corresponds to a small number of gray scales. When the display panel displays an image, gray scales and actual colors of the image cannot be well matched, which may cause colors of the display image to be indistinguishable. Thus, color cast may occur under different display brightness levels.

Figure 6:
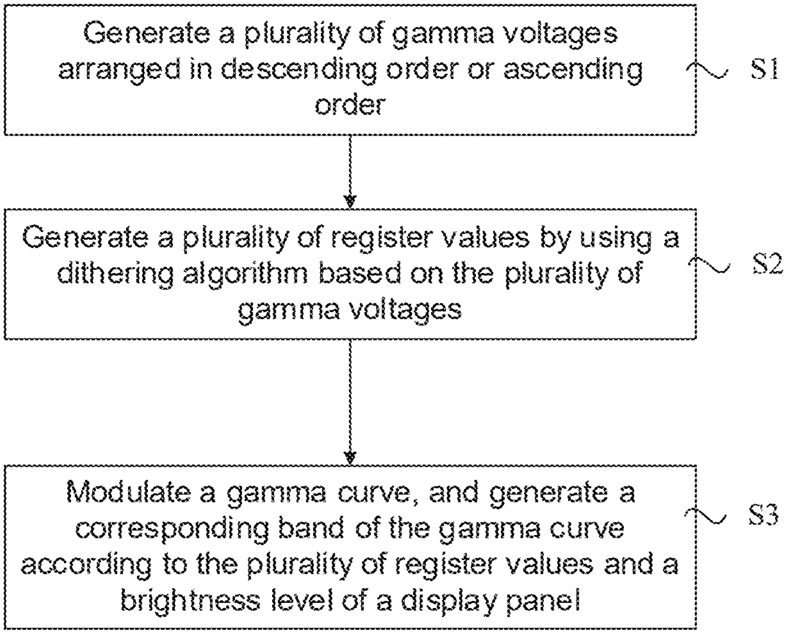
FIG. 6 is a diagram showing steps of a light adjustment method of a display device provided in some embodiments of the present disclosure.

In light of this, in yet another aspect, some embodiments of the present disclosure further provide a light adjustment method of a vehicle-mounted display device. As shown in FIG. 6, the light adjustment method is applied to the vehicle-mounted display device as described in any of the above embodiments, and the light adjustment method of the vehicle-mounted display device includes the followings.

In S1, a plurality of gamma voltages arranged in ascending order or descending order are generated.

In S2, based on the plurality of gamma voltages, a plurality of register values are generated by a dithering algorithm.

In S3, a gamma curve is modulated; and according to the plurality of register values and a brightness value of the display panel, a corresponding band of the gamma curve is generated.

In some examples, there are multiple gamma voltages. For example, there may be 256 gamma voltages. Each gamma voltage corresponds to one gray scale. That is, for step S1, any pixel of the display panel is adjusted within a range of 256 gray scales at most.

Figure 8:
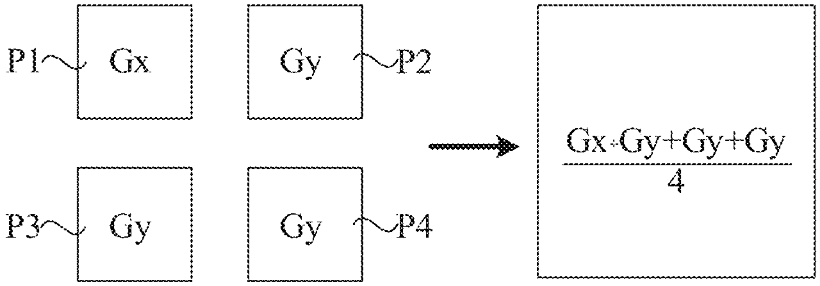
FIG. 8 is a diagram showing a process of a first dithering algorithm provided in some embodiments of the present disclosure.
Figure 9:
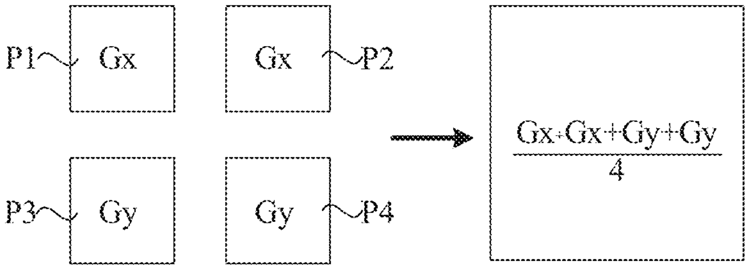
FIG. 9 is a diagram showing a process of a second dithering algorithm provided in some embodiments of the present disclosure.
Figure 10:
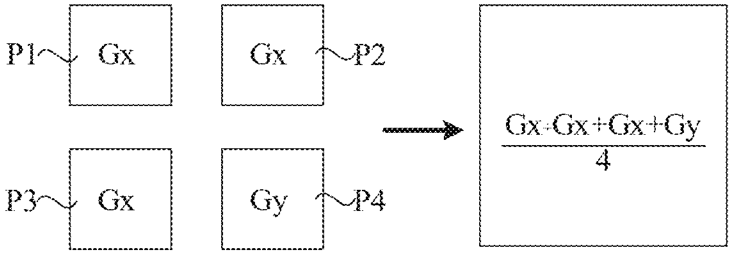
FIG. 10 is a diagram showing a process of a third dithering algorithm provided in some embodiments of the present disclosure.
Figure 15:
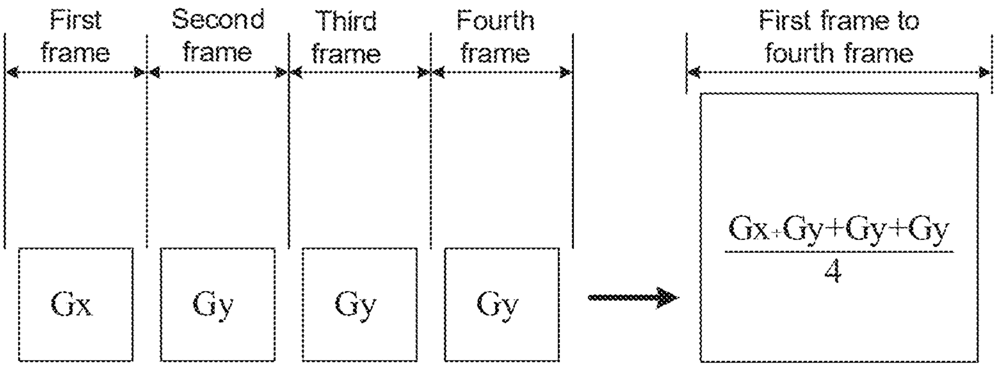
FIG. 15 is a diagram showing a process of a fourth dithering algorithm provided in some embodiments of the present disclosure.
Figure 16:
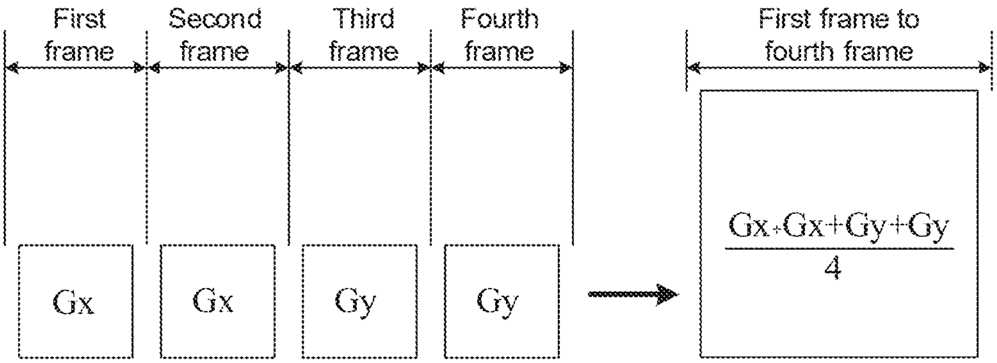
FIG. 16 is a diagram showing a process of a fifth dithering algorithm provided in some embodiments of the present disclosure.
Figure 17:
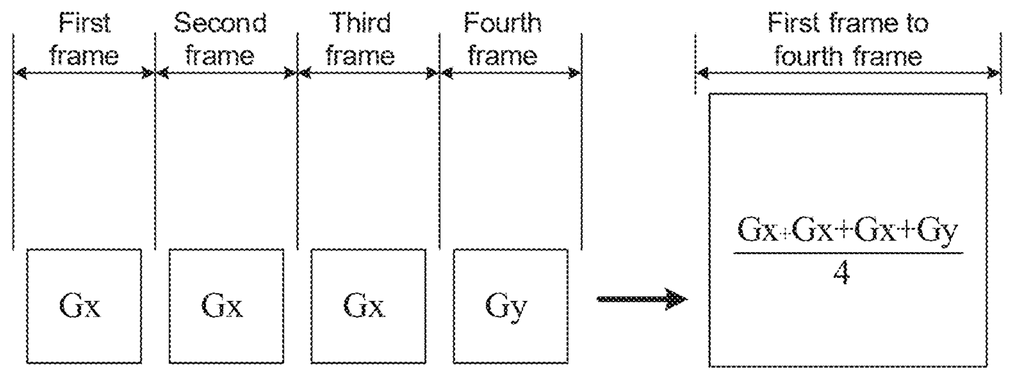
FIG. 17 is a diagram showing a process of a sixth dithering algorithm provided in some embodiments of the present disclosure.

For step S2, FIGS. 8 to 10 and 15 to 17 show processes of extending the range of the register values by the dithering algorithm, FIGS. 8 to 10 show a dithering algorithm method, and FIGS. 15 to 17 show another dithering algorithm method.

Figure 7:
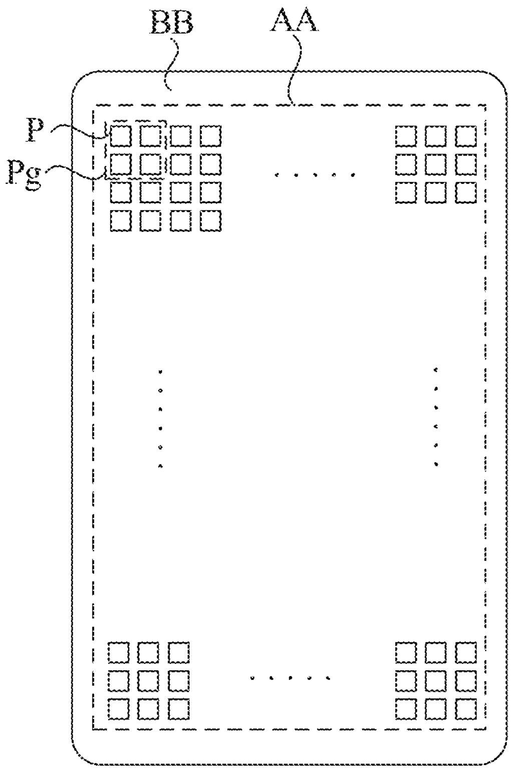
FIG. 7 is a structural diagram of a display panel provided in some embodiments of the present disclosure.

As shown in FIG. 7, the display panel has a display region AA and a peripheral region BB disposed on at least one side of the display region. The display region AA is provided therein with a plurality of pixels P, and each pixel P includes a plurality of sub-pixels. During the display process of the display panel, the plurality of sub-pixels are scanned row by row, and each sub-pixel provides different light-emitting brightness levels under control of different data signals. That is, each sub-pixel generates different gray scales. In this way, all sub-pixels create the image on the display panel.

For an 8-bit vehicle-mounted display device, the number of gray scales is 256. For a 10-bit vehicle-mounted display device, the number of gray scales is 1024. Therefore, for the vehicle-mounted display device, the higher the bits, the larger the grayscale range, and the smoother the light-dark change of images. The 8-bit vehicle-mounted display device may adopt a dithering algorithm to extend the number of gray scales of the vehicle-mounted display device.

The dithering algorithm refers to controlling gray scales of a certain pixel of adjacent frames or gray scales of adjacent pixels through a time manner or a spatial manner to make the entire screen obtain gray scales that cannot be provided originally, thereby extending the number of gray scales. That is to say, by using the dithering algorithm, the original 256 gray scales may be divided into more new gray scales, and each new gray scale corresponds to one register value. It can be understood that each new gray scale is a superposition state of a plurality of original gray scales. That is, one register value corresponds to one set of gamma voltages. That is to say, one register value corresponds to one new gray scale, one new gray scale is a superimposed state of a plurality of original gray scales corresponding to one set of gamma voltages, and the superimposed state of the plurality of original gray scales is a gray scale corresponding to the one register value. For convenience of distinction, a gray scale corresponding to a register value is referred to as a dummy gray scale below.

As shown in FIGS. 8 to 10, considering an example in which gray scales of adjacent pixels are controlled by a spatial manner, two adjacent pixels may be selected as a group, the two adjacent pixels are a first pixel P1 and a second pixel P2, and a gray scale of each of the two adjacent pixels may be any one of two continuous gray scales. In this way, a gray scale of the first pixel P1 may be a gray scale Gx, and a gray scale of the second pixel P2 may be a gray scale Gx, that is, a dummy gray scale of the two adjacent pixels is Gx. Alternatively, the gray scale of the first pixel P1 may be a gray scale Gy, and the gray scale of the second pixel P2 may be a gray scale Gy, that is, the dummy gray scale of the two adjacent pixels is Gy. Alternatively, the gray scale of the first pixel P1 may be a gray scale Gx, and the gray scale of the second pixel P2 may be a gray scale Gy, that is, the dummy gray scale of the two adjacent pixels is a mixed state of one gray scale Gx and one gray scale Gy. Therefore, the number of dummy gray scales of two adjacent pixels is twice the number of original gray scales. That is, when the number of gray scales is 256, the number of dummy gray scales is 512.

Alternatively, four adjacent pixels may be selected as a group, the four adjacent pixels are a first pixel P1, a second pixel P2, a third pixel P3 and a fourth pixel P4, and a gray scale of each of the four adjacent pixels may be any one of two continuous gray scales. For example, a gray scale of the first pixel P1 may be a gray scale Gx, a gray scale of the second pixel P2 may be a gray scale Gy, a gray scale of the third pixel P3 may be a gray scale Gy, and a gray scale of the fourth pixel may be a gray scale Gy, so that a dummy gray scale of the four adjacent pixels may be a mixed state of one gray scale Gx and three gray scales Gy. Alternatively, the gray scale of the first pixel P1 may be a gray scale Gx, the gray scale of the second pixel P2 may be a gray scale Gx, the gray scale of the third pixel P3 may be a gray scale Gy, and the gray scale of the fourth pixel may be a gray scale Gy, so that the dummy gray scale of the four adjacent pixels may be a mixed state of two gray scales Gx and two gray scales Gy. Alternatively, the gray scale of the first pixel P1 may be a gray scale Gx, the gray scale of the second pixel P2 may be a gray scale Gx, the gray scale of the third pixel P3 may be a gray scale Gx, and the gray scale of the fourth pixel may be a gray scale Gy, so that the dummy gray scale of the four adjacent pixels may be a mixed state of three gray scales Gx and one gray scale Gy.

In this way, based on the gray scale Gx and the gray scale Gy, there are three new dummy gray scales, and the number of dummy gray scales is three times greater than the number of gray scales corresponding to the gamma voltages. That is to say, the number of dummy gray scales is four times the number of gray scales corresponding to the gamma voltages. That is, when the number of gray scales is 256, the number of dummy gray scales is 1024, and the register values are arranged in ascending order of corresponding brightness levels, which are a register value R0, a register value R1, . . . , and a register value R1023. Therefore, it is possible to realize that the number of register values is extended from 8 bits to 10 bits, and the number of new register values is 1024.

Figure 11:
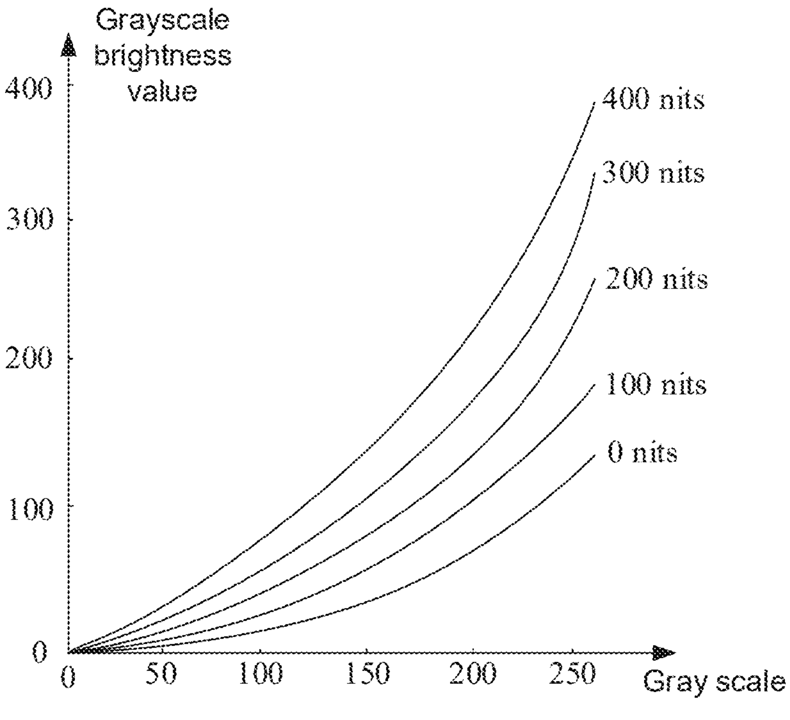
FIG. 11 is a structural diagram of gamma curves of brightness levels of a display panel provided in some embodiments of the present disclosure.

In some embodiments, as shown in FIG. 11, display brightness values (DBVs) of the display panel may be adjusted to control the display brightness level, and each DBV corresponds to a different gamma curve.

Since the sensitivity of human eyes to brightness in a dark environment is higher than the sensitivity of human eyes to brightness in a bright environment, the relationship between human perception and brightness is not linear but follows a certain law. FIG. 11 shows a gamma curve, the abscissa represents a brightness output by a pixel or a gray scale displayed by a pixel (hereinafter referred to as a gray scale), and the ordinate represents a grayscale brightness value output by a pixel. In the embodiments of the present disclosure, the grayscale brightness values refer to perception brightness levels of different gray scales under different brightness levels of the display panel. In order to make the display effect of the OLED display device meet the perception of the human eyes, the relationship between an input gray scale and a corresponding output grayscale brightness value needs to be set such that the grayscale brightness value is proportional to the γ power of the gray scale, and the relationship between the grayscale brightness value and the gray scale is referred to as a gamma curve of the vehicle-mounted display device. For example, the value of γ is set to 2.2±0.2, so that the display image is close to the image actually viewed by human eyes.

Each brightness value of the display panel corresponds to a different gamma curve. Correspondingly, in a register value-grayscale brightness value coordinate system, each brightness value corresponds to a gamma band, each gamma band includes 256 gray scales, and gamma curves of different gamma bands correspond to different brightness levels of the display panel. For example, a gamma curve of one gamma band may correspond to a case where the brightness level of the display panel is 5 nits, or a gamma curve of another gamma band may correspond to a case where the brightness level of the display panel is 800 nits.

Figure 12:
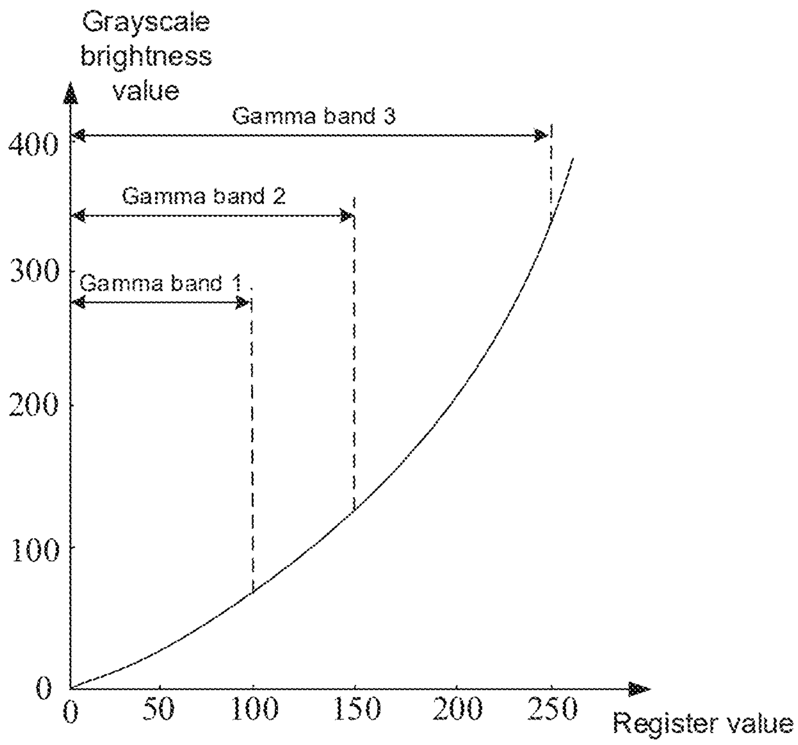
FIG. 12 is a structure diagram showing a plurality of gamma bands of a register value-grayscale brightness value provided in some embodiments of the present disclosure.

The grayscale brightness value corresponding to the gamma curve of the gamma band may match a corresponding register value. As shown in FIG. 12, there are 256 register values in total, each gamma voltage corresponds to a register value, and each register value may represent a gray scale (brightness level), so that a gray scale of the abscissa may be replaced with a register value.

Figure 13:
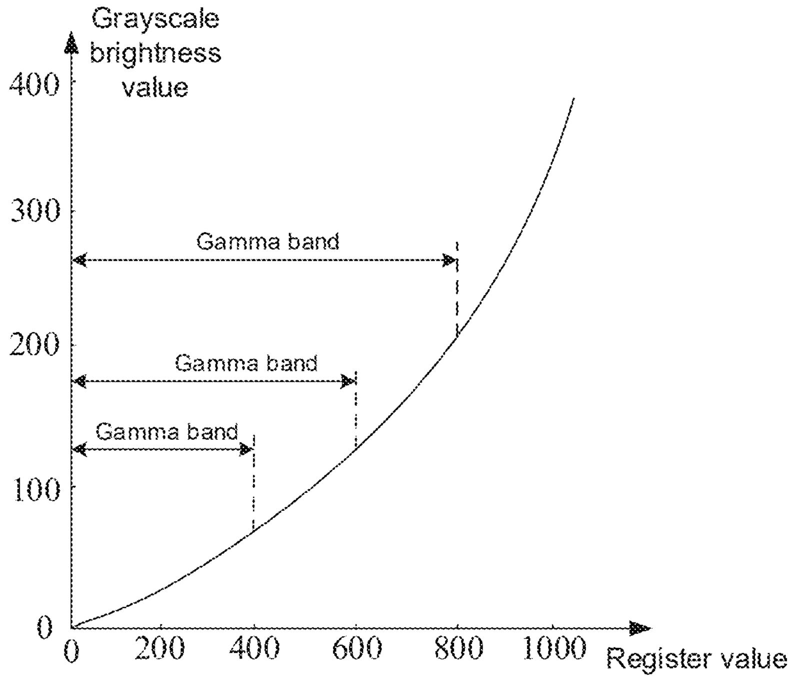
FIG. 13 is a structure diagram showing a plurality of gamma bands of another register value-grayscale brightness value provided in some embodiments of the present disclosure.

Similarly, as shown in FIG. 13, there are 1024 register values in total, and each register value represents a dummy gray scale (brightness level), and a dummy gray scale of the abscissa may be replaced with a register value.

As shown in FIGS. 12 and 13, register values of the display panel matches the corresponding gamma bands under different brightness levels of display panel. A range of register values of a corresponding gamma band under a high brightness level of the display panel is larger than a range of register values of a corresponding gamma band under a low brightness level of the display panel. Therefore, gray scales of the display panel under a low brightness level cannot match the register values, which cause colors of the display panel to be indistinguishable under a low brightness level, which may cause color cast of the display image in turn.

In FIG. 13, the range of register values is extended. Even under a low brightness level, the gray scales of the display panel match sufficient register values, so that the colors are clearly distinguished, and the display images have high color fidelity.

It should be noted that when the register values in FIGS. 12 and 13 are the same, gray scales and dummy gray scales (brightness levels) corresponding thereto are not the same. The register values in FIG. 12 have 256 brightness levels between the darkest and the brightest, and the register values in FIG. 13 have 1024 brightness levels between the darkest and the brightest.

It can be understood that the register values corresponding to the 256 gray scales of the gamma band is located between the register value J0 and a register value matching the maximum brightness level of the pixel corresponding to the gamma curve of the gamma band. Maximum register values of gamma curves of gamma bands under different brightness levels of the display panel are different, so that a range of register values for value finding of 256 gray scales of each gamma curve is different.

For example, the maximum brightness level of the gamma band corresponding to the gamma curve of the brightness level of 800 nits matches the register value J950, and the 256 gray scales of the gamma curve of the brightness level of 800 nits may perform value finding in a range from the register value J0 to the register value J950. Alternatively, the maximum brightness level of the gamma band corresponding to the gamma curve of the brightness value of 300 nits matches the register value J400, and the 256 gray scales of the gamma curve of the brightness level of 300 nits may perform value finding in a range from the register value J0 to the register value J400.

The dithering algorithm is used to extend the range of register values. As shown in FIG. 13, there are gamma curves corresponding to different brightness levels of the display panel, a gamma band of the gamma curve corresponds to 256 gray scales, and according to each gray scale, a corresponding register value may be found. Therefore, when the low-integration source driving chip can only provide 8-bit gray scales, the entire control system can provide 10-bit register values, so that the display panel can provide gray scales that could not be provided before. As a result, the number of gray scales is extended. In addition, under different brightness levels, no color cast or slight color cast occurs in the image displayed by the display panel, and the low-integration hardware can provide high-quality display images.

In some embodiments, the power management sub-circuit of the control system is configured to provide the first voltage signal to the gamma register sub-circuit of the control system, and the timing control sub-circuit of the control system is configured to provide the plurality of voltage fixed point signals to the gamma register sub-circuit.

Figure 14:
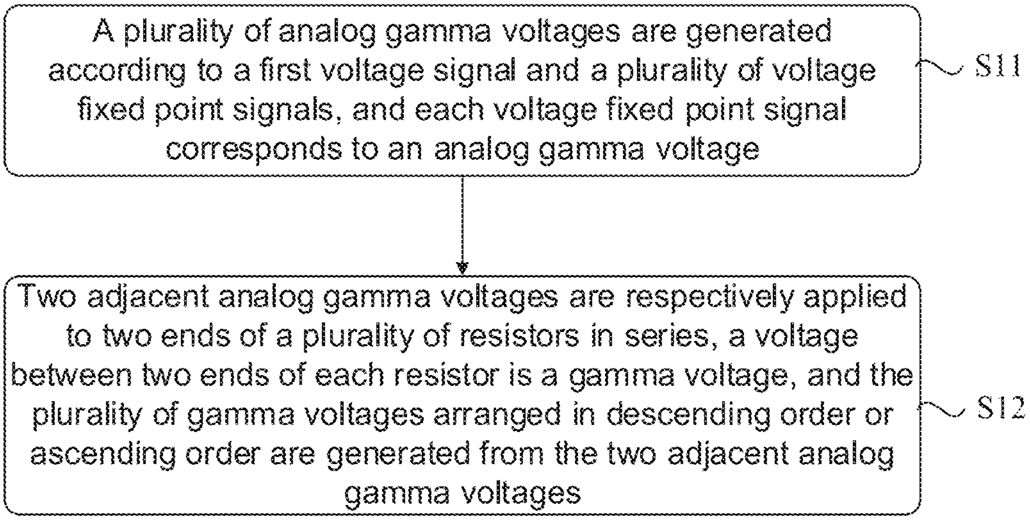
FIG. 14 is a diagram showing steps of a gamma voltage generation method provided in some embodiments of the present disclosure.

As shown in FIG. 14, the gamma voltage generation method includes the followings.

In S11, a plurality of analog gamma voltages are generated according to the first voltage signal and the plurality of voltage fixed point signals, and each voltage fixed point signal corresponds to an analog gamma voltage.

In S12, two adjacent analog gamma voltages are respectively applied to two ends of a plurality of resistors in series, a voltage between two ends of each resistor is a gamma voltage, and a plurality of gamma voltages arranged in ascending order are generated according to the two adjacent analog gamma voltages.

In some examples, the gamma register sub-circuit receives the voltage fixed point signals, and may generate the plurality of analog gamma voltages through the voltage reduction device according to the first voltage signal, and each voltage fixed point signal corresponds to a generated analog gamma voltage. For example, the number of voltage fixed point signals may be nine, correspondingly the number of analog gamma voltages is nine, and the nine analog gamma voltages are arranged in ascending order of voltage values as follows: an analog gamma voltage GM1, an analog gamma voltage GM2, an analog gamma voltage GM3, . . . , and an analog gamma voltage GM9.

The gamma register sub-circuit transmits the analog gamma voltages to the source driving sub-circuit. The source driving sub-circuit obtains the gamma voltages by voltage division of a resistor string. The source driving sub-circuit includes a circuit of the plurality of resistors in series; for example the number of the resistors may be 32; and two adjacent gamma analog voltages are respectively transmitted to two ends of the circuit of the plurality of resistors in series, and a voltage between two ends of each resistor is a gamma voltage. For example, as shown in FIG. 19, the analog gamma voltage GMi (i=1,2, . . ., 8; e.g. GM1) is transmitted to one end of the circuit of the plurality of resistors in series, and the analog gamma voltage GMi+1 (e.g. GM2) is transmitted to another end of the circuit of the plurality of resistors in series. The circuit of the plurality of resistors in series has 32 resistors, and a voltage between the two ends of each resistor is a gamma voltage, so that 32 gamma voltages Vj ~Vj+31 (j+32×(i−1)) may be generated between the analog gamma voltage GM1 and the analog gamma voltage GM2. In this way, eight groups of gamma voltages may be generated, and each group of gamma voltages is generated by dividing two adjacent analog gamma voltages through the resistor string. The number of gamma voltages in each group is 32, that is, there are 256 gamma voltages in total.

It should be noted that the embodiments of the present disclosure do not limit the number of analog gamma voltages generated by the gamma register sub-circuit and the number of gamma voltages generated by each resistor string in the source driving sub-circuit. It can be understood that the total number of gamma voltages is a product of the number of analog gamma voltages and the number of resistors of a resistor string. The total number of gamma voltages should match the number of gray scales in the grayscale image. For example, the total number of gamma voltages may be 16, 32 or 256. In the embodiments of the present disclosure, the number of gamma voltages may be extended to 256.

By controlling the voltage fixed point signals, the voltage between two adjacent analog gamma voltages may be controlled, and the accuracy of the gamma voltages (or the magnitudes of the gamma voltages) may be controlled. The low-integration hardware may be used in the embodiments of the present disclosure to generate high-precision gamma voltages, and can control the magnitudes of the gamma voltages.

In some embodiments, the dithering algorithm includes as follows: a plurality of adjacent pixels of the display panel constitute a pixel group, a gray scale of each pixel in the pixel group corresponds to one gamma voltage of the plurality of gamma voltages, and a value of a gray scale of the pixel group is an average value of values of gray scales of the plurality of adjacent pixels.

Gamma voltages of the multiple pixels corresponding to the gray scale of the pixel group are a register value corresponding to the gray scale of the pixel group.

In some examples, the dithering algorithm may control adjacent pixels by using the spatial manner, and by controlling change of gray scales of the adjacent pixels, the adjacent pixels may display various gray scales, which has been described above, and will not be repeated here.

In some other embodiments, as shown in FIGS. 15 to 17, the dithering algorithm includes as follows: in a plurality of consecutive frames, an average value of values of gray scales of the pixels of the display panel in each frame is a displayed gray scale of any pixel. Gamma voltages corresponding to gray scales of any pixel in the plurality of consecutive frames are a register value corresponding to the displayed gray scale.

In some embodiments, in at least two adjacent frames, values of gray scales of any pixel are the same and/or continuous, and the number of register values is at least 512.

In some examples, the dithering algorithm may also use the time manner to control gray scales of the pixels when adjacent frames are displayed.

For example, two adjacent frames are selected, a gray scale of any pixel of the display panel in a first frame is Gx, and a gray scale of any pixel of the display panel in a second frame is Gy; therefore, an overall dummy gray scale displayed by the pixel in display images of the two adjacent frames may be a mixed state of one gray scale Gx and one gray scale Gy.

Alternatively, the gray scale of any pixel of the display panel in the first frame is Gx, and the gray scale of any pixel of the display panel in the second frame is Gx; therefore, the overall dummy gray scale displayed by the pixel in the display images of the two adjacent frames may be a gray scale Gx.

Alternatively, the gray scale of any pixel of the display panel in the first frame is Gy, and the gray scale of any pixel of the display panel in the second frame is Gy; therefore, the overall dummy gray scale displayed by the pixel in the display images of the two adjacent frames may be a gray scale Gy.

In this way, the number of dummy gray scales is double the number of gray scales corresponding to the gamma voltages. That is, when the number of gray scales is 256, the number of dummy gray scales is 512.

In some other examples, four adjacent frames are selected, a gray scale of any pixel of the display panel in a first frame is Gx, a gray scale of any pixel of the display panel in a second frame is Gy, a gray scale of any pixel of the display panel in a third frame image is Gy, and a gray scale of any pixel of the display panel in a fourth frame image is Gy; therefore, an overall dummy gray scale displayed by the pixel in display images of the four adjacent frames may be a mixed state of one gray scale Gx and three gray scales Gy.

Alternatively, the gray scale of any pixel of the display panel in the first frame is Gx, the gray scale of any pixel of the display panel in the second frame is Gx, the gray scale of any pixel of the display panel in the third frame is Gy, and the gray scale of any pixel of the display panel in the fourth frame is Gy; therefore, the overall dummy gray scale displayed by the pixel in the display images of the four adjacent frames may be a mixed state of two gray scales Gx and two gray scales Gy.

Alternatively, the gray scale of any pixel of the display panel in the first frame is Gx, the gray scale of any pixel of the display panel in the second frame is Gx, the gray scale of any pixel of the display panel in the third frame is Gx, and the gray scale of any pixel of the display panel in the fourth frame is Gy; therefore, the overall dummy gray scale displayed by the pixel in the display images of the four adjacent frames may be a mixed state of three gray scales Gx and one gray scale Gy.

In this way, the number of dummy gray scales is three times greater than the number of gray scales corresponding to the gamma voltages. That is to say, the number of dummy gray scales is four times the number of gray scales corresponding to the gamma voltages. That is, when the number of gray scales is 256, the number of dummy gray scales is 1024. The register values for representing brightness levels in ascending order are a register value R0, a register value R1, . . . , and a register value R1023 in sequence. The range of register values is extended from 8 bits to 10 bits, and the number of register values is 1024.

Under different display brightness levels, the gray scales of the pixels of the display panel need to be adjusted within a certain register value range to create a certain display brightness level without color cast in the display image. Under different display brightness levels, the brightness level of the pixel with the maximum grayscale value of the display panel will decrease as the display brightness level decreases.

Correspondingly, a range of dummy gray scales selectable for the pixels of the display panel is reduced, that is, a range of register values selectable for the pixels of the display panel is reduced.

The embodiments of the present disclosure extend the range of register values to 10 bits. However, when the display panel is in a low gray scale, the range of register values selectable for the pixels of the display panel is small, and in this case, the image displayed by the display panel may have color cast.

In light of this, the light adjustment method of the vehicle-mounted display device provided in some embodiments of the present disclosure further includes the following.

In H1, the vehicle-mounted display device modulates a data signal from a continuous signal to a pulse signal.

In H2, a maximum register value corresponding to the pixels of the display panel is obtained according to a duty ratio of the pulse signal and the brightness level of the display panel, and a corresponding gamma curve is selected according to the maximum register value corresponding to the pixels.

In some examples, the brightness levels (gray scales) of the pixels of the display panel may be controlled by modulating the power of the data signal. When the display panel is at a low brightness level, the range of dummy gray scales selectable for the pixels is small. For example, as shown in Table 1, the number of first register values described in Table 1 refers to the number of register values selectable for each pixel of the display panel when the data signal output by the control system is the continuous signal under a corresponding brightness level of the display panel, and the number of second register values described in Table 1 refers to the number of register values selectable for the pixel of the display panel when the data signal output by the control system is modulated into the pulse signal under a corresponding brightness level of the display panel. The duty ratio described in Table 1 refers to a duty ratio of the pulse signal modulated from the data signal output by the control system.

TABLE 1

| Gamma band | Duty ratio | Brightness level of display panel (nits) | Number of first register values | Number of second register values |
|---|---|---|---|---|
| 1 | 97 | 815 | 1024 | 1024 |
| 2 | 85 | 720 | 888 | 1024 |
| 3 | 69 | 609 | 751 | 1024 |
| 4 | 55 | 501 | 618 | 1024 |
| 5 | 41 | 394 | 486 | 1024 |
| 6 | 30 | 286 | 352 | 1024 |
| 7 | 25 | 179 | 221 | 883 |
| 8 | 19 | 107 | 132 | 695 |
| 9 | 14 | 57 | 70 | 502 |
| 10 | 9 | 5 | 6 | 69 |

For example, when the display panel is at a light adjustment brightness level of 5 nits and the data signal output by the control system is the continuous signal, the pixel may select a value from six dummy gray scales. That is to say, in this case, the display image of the display panel may have color cast due to a small number of dummy gray scales.

An overall light-emitting brightness level of the pixels in a frame decreases, but the light-emitting brightness level of the pixel after receiving each pulse signal is higher than the overall light-emitting brightness level in the frame. That is, when the brightness level of the display panel decreases, an instantaneous brightness level of the pixel is increased. Therefore, by using the light adjustment method provided in the embodiments of the present disclosure, when the display panel is at a certain brightness level, a gamma curve corresponding to the instantaneous brightness level of the pixel should be referenced. Since the instantaneous brightness level is higher than the brightness level of the display panel, it can be seen that the range of dummy gray scales selectable for the pixel is extended. That is, by using the light adjustment method provided in the present disclosure, when the display panel is at a low brightness level, the range of register values will be greatly increased.

For example, when the display panel is at 5 nits and the light adjustment method provided in the present disclosure is not used, the pixel may select a value from six register values. By adopting the light adjustment method provided in the present disclosure, the duty ratio of the pulse signal is 9%, and the pixel may select a value from 69 register values.

For example, as shown in Table 1, the data signal is modulated from the continuous signal into the pulse signal. That is, the overall light-emitting brightness level of the pixel in one frame is reduced to achieve the purpose of reducing the brightness level of the display panel to 5 nits. The instantaneous brightness level of the pixel at each light emitting is higher than 5 nits. That is to say, the selection range of dummy gray scales of the pixel may be larger. For example, when the duty ratio of the pulse signal (the data signal) is 9%, the brightness level of the display panel is 5 nits, and the number of dummy gray scales selectable for the pixel of the display panel is 69. At this time, the display image of the display panel has more color zones, and the color cast is obviously improved.

The pixels have more register value selection ranges. By adopting the light adjustment method provided in the embodiments of the present disclosure, when the display panel is at a low brightness level, the display image is clear, and the color cast is obviously improved.

In some embodiments, when the brightness level of the display panel changes, the brightness levels of the plurality of consecutive frames gradually decrease or increase. When the gamma curve corresponding to the display brightness level is constant, a ratio of a brightness level of a current frame in the plurality of consecutive frames to a brightness level of a next frame image is the same as a ratio of a duty ratio of a data signal for generating the current frame to a duty ratio of a data signal for generating the next frame.

In some examples, during the actual use of the vehicle-mounted display device, the user adjusts the display brightness level of the vehicle-mounted display device (for example, by dragging a brightness slider on the display screen of the vehicle-mounted display device to adjust the brightness level of the display screen of the vehicle-mounted display device), or the vehicle-mounted display device automatically adjusts the display brightness level thereof in response to the environmental brightness changes.

In the process of adjusting the brightness level of the vehicle-mounted display device or the display panel, in order to prevent the brightness jump problem, brightness level of the plurality of consecutive frames may gradually decrease or increase. The gamma curve corresponding to the display brightness level of the display panel is kept constant, and by controlling the duty ratio, the brightness levels of the plurality of frames may be controlled to decrease or increase. The larger the duty ratio, the lower the brightness level of the image. Therefore, the variation magnitude of the duty ratio of the data signal for generating each frame should not be excessively large, so as to avoid the brightness jump caused by excessive brightness change.

In some embodiments, the vehicle-mounted display device modulates the data signal into the pulse signal in the following way that: the source driving sub-circuit converts the data signal into the pulse signal; or the level shift sub-circuit transmits a control signal to the GOA circuit, and an enable signal output by the GOA circuit can control turn-on and turn-off of a current path that transmits a data signal to a pixel driving circuit. Therefore, the modulation of the continuous data signal into the pulse signal is realized.

In some embodiments, the number of pulses of a data signal for generating one frame is four. For example, a data signal for generating each frame of the vehicle-mounted OLED display device includes four pulses.

Figure 18:
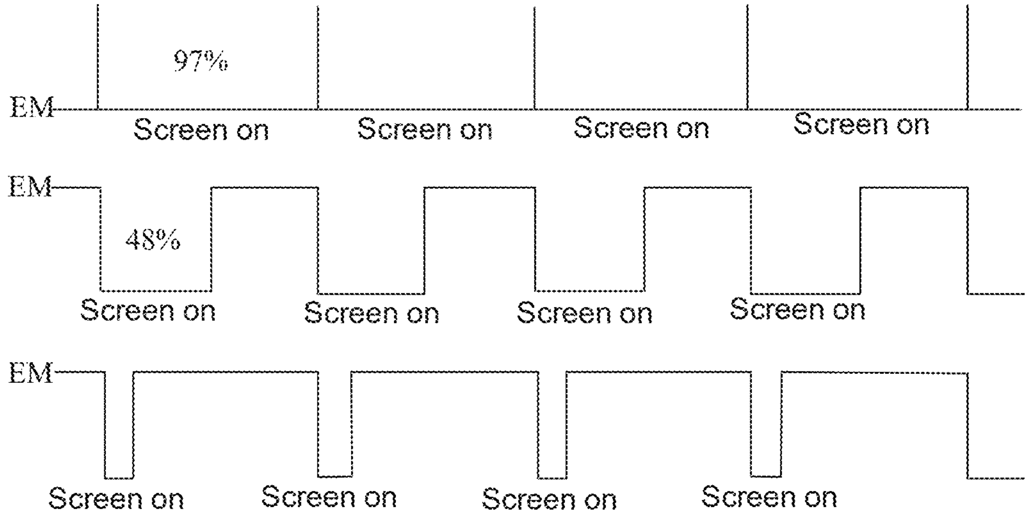
FIG. 18 is a structural diagram of enable signals of a display panel at different brightness levels provided in some embodiments of the present disclosure.

For example, as shown in FIG. 18, in a frame, the number of pulses of the enable signal EM for controlling the turn-on and turn-off of the current path that transmits the data signal to the pixel driving circuit is 4. For example, in combination with FIG. 18 and Table 1, it can be seen that when the duty ratio of the enable signal EM is 97%, a corresponding brightness level of the display panel may be 815 nits; when the duty ratio of the enable signal EM is 48%, a corresponding brightness level of the display panel may be located between 390 nits and 500 nits; and when the duty ratio of the enable signal EM is 9%, a corresponding brightness level of the display panel may be 5 nits. It can be understood that the duty ratio of the enable signal directly affects the duty ratio of the data signal. That is, the duty ratio of the enable signal is the same as the duty ratio of the data signal. In addition, when the duty ratio of the data signal is different, the power of the data signal is reduced accordingly.

It should be noted that, in some other types of OLED display devices, e.g., a mobile phone using an OLED display panel, the data signal for generating one frame may include 16 pulses or 32 pulses.

In some embodiments, the duty ratio of the pulse signal is greater than or equal to 9%. For example, when the duty ratio of the pulse signal is 9%, the brightness level of the display panel is 5 nits. The minimum display brightness level of 5 nits may meet the minimum brightness requirements of some display panels. Of course, if the duty ratio of the pulse signal is excessively low, the OLED display panel cannot emit light stably.

Some embodiments of the present disclosure provide a computer-readable storage medium. The computer-readable storage medium stores computer instructions executable by a processor that, when executed by a processor, implement one or more steps of the light adjustment method of the vehicle-mounted display device as described above.

It should be noted that the computer-readable storage medium provided in the embodiments of the present disclosure may include, but is not limited to: a magnetic storage device (such as a hard disk, a floppy disk, or a tape), a read-only memory (ROM), a random access memory (RAM), an erasable programmable read-only memory (EPROM) and other media that can store program codes.

Some embodiments of the present disclosure provide a computer program product. When run on a computer, the computer program product causes the computer to execute one or more steps of the light adjustment method of the vehicle-mounted display device as described above.

The computer storage medium or the computer program product provided in the embodiments of the present disclosure are all used to implement the light adjustment method of the vehicle-mounted display device provided above. Therefore, the beneficial effects achieved by the computer storage medium or the computer program product may refer to the beneficial effects of the corresponding method provided above, which will not be repeated here.

The foregoing descriptions are merely specific implementation manners of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A control system, comprising: a timing control sub-circuit, a gamma register sub-circuit, a source driving sub-circuit, and a power management sub-circuit, wherein the timing control sub-circuit is electrically connected to the gamma register sub-circuit and the source driving sub-circuit, the gamma register sub-circuit is electrically connected to the source driving sub-circuit, and the power management sub-circuit is electrically connected to the timing control sub-circuit, the gamma register sub-circuit and the source driving sub-circuit;

wherein the timing control sub-circuit is configured to: read pre-stored fixed point data, generate voltage fixed point signals, and transmit the voltage fixed point signals to the gamma register sub-circuit; and receive N gamma voltages provided by the source driving sub-circuit, and generate M register values, M being greater than N; and the timing control sub-circuit is further configured to transmit the M register values to the source driving sub-circuit in response to a first signal received at a client assembly;

the gamma register sub-circuit is configured to: in response to a first operating signal received at the power management sub-circuit and the voltage fixed point signals received at the timing control sub-circuit, generate a plurality of analog gamma voltage signals and transmit the plurality of analog gamma voltage signals to the source driving sub-circuit;

the source driving sub-circuit is configured to: receive the plurality of analog gamma voltage signals, and generate a plurality of gamma voltages between two adjacent analog gamma voltage signals; and in response to a register value signal received at the timing control sub-circuit, generate a data signal and transmit the data signal to a display panel;

the power management sub-circuit is configured to: generate the first operating signal and transmit the first operating signal to the gamma register sub-circuit, and generate a second operating signal and a third operating signal, and transmit the second operating signal to the timing control sub-circuit and transmit the third operating signal to the source driving sub-circuit.

2. The control system according to claim 1, wherein the timing control sub-circuit includes at least:

a first memory configured to pre-store the fixed point data;

a timing control chip electrically connected to the first memory, wherein the timing control chip is configured to: read the fixed point data in the first memory, generate the voltage fixed point signals, and receive the N gamma voltages transmitted by the source driving sub-circuit, generate the M register values and store the M register values; and the timing control chip is further configured to: in response to the first signal received at the client assembly, read the M register values and transmit the M register values to the source driving sub-circuit; and a second memory electrically connected to the timing control chip, the second memory being configured to receive the M register values generated by a dithering calculation module of the timing control chip and store the M register values.

3. The control system according to claim 2, wherein the gamma register sub-circuit includes at least a gamma chip, and the gamma chip is electrically connected to the timing control chip, the source driving sub-circuit and the power management sub-circuit;

the gamma chip is configured to, in response to the voltage fixed point signals received at the timing control chip and the first operating signal received at the power management sub-circuit, generate the plurality of analog gamma voltage signals and transmit the plurality of analog gamma voltage signals to the source driving sub-circuit.

4. The control system according to claim 3, wherein the source driving sub-circuit includes at least a source driving chip, and the source driving chip is electrically connected to the timing control chip and the gamma chip;

the source driving chip is configured to: receive the plurality of analog gamma voltage signals output by the gamma chip, and generate the plurality of gamma voltages; and receive the register value signal output by the timing control chip, and transmit the data signal to the display panel.

5. The control system according to claim 4, wherein the power management sub-circuit includes at least a power management chip, and the power management chip is electrically connected to the timing control chip, the gamma chip, the source driving chip, a level shift sub-circuit and a display panel;

the power management chip is configured to: provide the second operating signal to the timing control chip and provide the third operating signal to the source driving chip, provide the first operating signal to the gamma chip, provide a high/low level signal to the level shift sub- circuit, and provide a reset signal to the display panel.

6. The control system according to claim 5, further comprising the level shift sub-circuit, wherein the level shift sub-circuit is electrically connected to the timing control sub-circuit and the power management chip.

7. The control system according to claim 6, further comprising a level shift chip, wherein the level shift chip is electrically connected to the timing control chip and the power management chip, and the level shift chip is configured to, in response to a timing control signal received at the timing control chip, generate a second signal and transmit the second signal to the display panel.

8. A vehicle-mounted display device, comprising:

the control system according to claim 1; and the display panel electrically connected to the control system.

9. A light adjustment method of a vehicle-mounted display device, applied to the vehicle-mounted display device according to claim 8, wherein the control system of the vehicle- mounted display device transmits the data signal to the display panel;

the light adjustment method of the vehicle-mounted display device comprising:

generating the plurality of gamma voltages arranged in descending order or ascending order;

generating a plurality of register values by using a dithering algorithm based on the plurality of gamma voltages; and modulating a gamma curve, and generating a corresponding band of the gamma curve according to the plurality of register values and a brightness level of the display panel.

10. The light adjustment method of the vehicle-mounted display device according to claim 9, wherein the power management sub-circuit of the control system is configured to provide the first operating signal to the gamma register sub-circuit of the control system, and the timing control sub-circuit of the control system is configured to provide a plurality of voltage fixed point signals to the gamma register sub-circuit;

the step of generating the plurality of gamma voltages arranged in descending order or ascending order includes:

generating a plurality of analog gamma voltages according to the first operating signal and the plurality of voltage fixed point signals, each voltage fixed point signal corresponding to an analog gamma voltage; and two adjacent analog gamma voltages being respectively applied to two ends of a plurality of resistors in series, a voltage between two ends of a resistor being a gamma voltage, and the plurality of gamma voltages arranged in descending order or ascending order being generated from the two adjacent analog gamma voltages.

11. The light adjustment method of the vehicle-mounted display device according to claim 9, wherein a number of the plurality of gamma voltages is 256.

12. The light adjustment method of the vehicle-mounted display device according to claim 9, wherein the step of generating the plurality of register values by using the dithering algorithm based on the plurality of gamma voltages includes:

a plurality of adjacent pixels of the display panel constituting a pixel group, a gray scale of each pixel in the pixel group corresponding to a gamma voltage of the plurality of gamma voltages, and a value of a gray scale of the pixel group being an average value of values of gray scales of the plurality of adjacent pixels; and gamma voltages of the plurality of pixels corresponding to the gray scale of the pixel group being a register value corresponding to the gray scale of the pixel group.

13. The light adjustment method of the vehicle-mounted display device according to claim 12, wherein a number of the plurality of adjacent pixels in the pixel group is at least two, and the values of the gray scales of the plurality of adjacent pixels are the same and/or continuous; and a number of the plurality of register values is at least 512.

14. The light adjustment method of the vehicle-mounted display device according to claim 9, wherein the step of generating the plurality of register values by using the dithering algorithm based on the plurality of gamma voltages includes:

an average value of values of gray scales of pixels of the display panel in each frame of a plurality of consecutive frames being a display gray scale of any pixel; and gamma voltages corresponding to gray scales of the any pixel in the plurality of consecutive frames being a register value corresponding to the display gray scale of the any pixel.

15. The light adjustment method of the vehicle-mounted display device according to claim 14, wherein values of gray scales of the any pixel in at least two adjacent frames are the same and/or continuous; and a number of the plurality of register values is at least 512.

16. The light adjustment method of the vehicle-mounted display device according to claim 9, further comprising:

the vehicle-mounted display device modulating the data signal from a continuous signal to a pulse signal;

obtaining a maximum register value corresponding to pixels of the display panel according to a duty ratio of the pulse signal and the brightness level of the display panel; and selecting a corresponding gamma curve according to the maximum register value corresponding to the pixels.

17. The light adjustment method of the vehicle-mounted display device according to claim 16, wherein selecting the corresponding gamma curve according to the maximum register value corresponding to the pixels includes:

a maximum value of register values corresponding to the gamma curve being the same as the maximum register value corresponding to the pixels of the display panel.

18. The light adjustment method of the vehicle-mounted display device according to claim 16, wherein brightness levels of a plurality of consecutive frames of the display panel decrease or increase, and the gamma curve is constant;

a ratio of a brightness level of a current frame of the plurality of consecutive frames to a brightness level of a next frame of the plurality of consecutive frames is the same as a ratio of a duty ratio of a pulse signal for generating the current frame to a duty ratio of a pulse signal for generating the next frame.

19. The light adjustment method of a vehicle-mounted display device according to claim 16, wherein a number of pulses of a data signal for generating one frame is four, or a duty ratio of the pulse signal is greater than or equal to 9%.

20. A non-transitory computer-readable storage medium storing computer program instructions executable by a processor that, when executed by a processor, implement one or more steps of the light adjustment method of the vehicle-mounted display device according to claim 9.

* * * * *